US008869616B1

(12) United States Patent
Sridharamurthy et al.

(10) Patent No.: US 8,869,616 B1
(45) Date of Patent: Oct. 28, 2014

(54) METHOD AND STRUCTURE OF AN INERTIAL SENSOR USING TILT CONVERSION

(75) Inventors: Sudheer Sridharamurthy, Menlo Park, CA (US); Xiao "Charles" Yang, Cupertino, CA (US)

(73) Assignee: mCube Inc., San Jose, CA (US)

( * ) Notice: Subject to any disclaimer, the term of this patent is extended or adjusted under 35 U.S.C. 154(b) by 405 days.

(21) Appl. No.: 13/163,672

(22) Filed: Jun. 18, 2011

Related U.S. Application Data

(60) Provisional application No. 61/356,467, filed on Jun. 18, 2010.

(51) Int. Cl.
  *G01P 15/08* (2006.01)
  *G01P 15/12* (2006.01)
  *G01P 15/02* (2013.01)

(52) U.S. Cl.
  USPC ..................................................... 73/514.12

(58) Field of Classification Search
  USPC ..................................................... 73/504.12
  See application file for complete search history.

(56) References Cited

U.S. PATENT DOCUMENTS

| | | |
|---|---|---|
| 3,614,677 A | 10/1971 | Wilfinger |
| 4,954,698 A | 9/1990 | Yasunaga et al. |
| 5,140,745 A | 8/1992 | McKenzie |
| 5,157,841 A | 10/1992 | Dinsmore |
| 5,173,597 A | 12/1992 | Anglin |
| 5,488,765 A | 2/1996 | Kubota et al. |
| 5,493,769 A | 2/1996 | Sakai et al. |
| 5,610,414 A | 3/1997 | Yoneda et al. |
| 5,668,033 A | 9/1997 | Ohara |
| 5,729,074 A | 3/1998 | Shiomi et al. |
| 6,046,409 A | 4/2000 | Ishii et al. |
| 6,076,731 A | 6/2000 | Terrell |
| 6,115,261 A | 9/2000 | Platt et al. |
| 6,188,322 B1 | 2/2001 | Yao et al. |
| 6,263,736 B1 | 7/2001 | Thunder et al. |
| 6,278,178 B1 | 8/2001 | Kwon et al. |
| 6,480,699 B1 | 11/2002 | Lovoi |
| 6,483,172 B1 | 11/2002 | Cote |

(Continued)

OTHER PUBLICATIONS

Notice of Allowance for U.S. Appl. No. 12/717,070, mailed on Mar. 9, 2012, 9 pages.

(Continued)

*Primary Examiner* — Hezron E Williams
*Assistant Examiner* — Gregory J Redmann
(74) *Attorney, Agent, or Firm* — Kilpatrick Townsend & Stockton LLP

(57) ABSTRACT

A method and structure for fabricating an inertial sensing device using tilt conversion to sense a force in the out-of-plane direction. The method can include forming anchor structure(s) coupled to portions of a surface region of a substrate member. Also, the method can include forming flexible anchor members coupled to portions of the anchor structures and frame structures, which can be formed overlying the substrate. The method can also include forming flexible frame members coupled to portions of the frame structures and movable structures, which can also be formed overlying the substrate. Forming the movable structures can include forming peripheral and central movable structures, which can be coupled to flexible structure members. Peripheral movable structures having flexible tilting members can convert a pure tilting out-of-plane motion to a pure translational out-of-plane motion. The forming of these elements can include performing an etching process on a single silicon material.

9 Claims, 7 Drawing Sheets

(56) References Cited

U.S. PATENT DOCUMENTS

| | | |
|---|---|---|
| 6,485,273 B1 | 11/2002 | Goodwin-Johansson |
| 6,534,726 B1 | 3/2003 | Okada et al. |
| 6,576,999 B2 | 6/2003 | Sakai et al. |
| 6,656,604 B2 | 12/2003 | Hasewaga |
| 6,753,664 B2 | 6/2004 | Neufeld et al. |
| 6,855,572 B2 | 2/2005 | Jeung et al. |
| 6,912,336 B2 | 6/2005 | Ishii |
| 6,933,165 B2 | 8/2005 | Musolf et al. |
| 6,979,872 B2 | 12/2005 | Borwick et al |
| 7,019,434 B2 | 3/2006 | Helmbrecht |
| 7,095,226 B2 | 8/2006 | Wan et al. |
| 7,145,555 B2 | 12/2006 | Taylor et al. |
| 7,183,630 B1 | 2/2007 | Fogelson et al. |
| 7,193,312 B2 | 3/2007 | Boon et al. |
| 7,195,945 B1 | 3/2007 | Edelstein et al. |
| 7,239,000 B2 | 7/2007 | Witcraft |
| 7,253,079 B2 | 8/2007 | Hanson et al. |
| 7,258,009 B2 | 8/2007 | Imai |
| 7,358,724 B2 | 4/2008 | Taylor et al. |
| 7,370,530 B2 | 5/2008 | DCamp et al. |
| 7,391,091 B2 | 6/2008 | Tondra |
| 7,402,449 B2 | 7/2008 | Fukuda et al. |
| 7,430,674 B2 | 9/2008 | Van Mueller et al. |
| 7,453,269 B2 | 11/2008 | Won et al. |
| 7,454,705 B2 | 11/2008 | Cadez et al. |
| 7,456,042 B2 | 11/2008 | Stark |
| 7,493,496 B2 | 2/2009 | Smith et al. |
| 7,498,715 B2 | 3/2009 | Yang |
| 7,511,379 B1 | 3/2009 | Flint |
| 7,514,760 B1 | 4/2009 | Quevy |
| 7,521,783 B2 | 4/2009 | Tsai et al. |
| 7,536,909 B2 | 5/2009 | Zhao et al. |
| 7,585,750 B2 | 9/2009 | Do et al. |
| 7,599,277 B1 | 10/2009 | Kato et al. |
| 7,612,443 B1 | 11/2009 | Bernstein et al. |
| 7,671,478 B2 | 3/2010 | Wathanawasam et al. |
| 7,676,340 B2 | 3/2010 | Yasui |
| 7,690,255 B2 | 4/2010 | Gogoi et al. |
| 7,708,189 B1 | 5/2010 | Cipriano |
| 7,713,785 B1 | 5/2010 | Flint |
| 7,779,689 B2 | 8/2010 | Li et al. |
| 7,814,791 B2 | 10/2010 | Andersson et al. |
| 7,814,792 B2 | 10/2010 | Tateyama et al. |
| 7,814,793 B2 | 10/2010 | Sato |
| 7,861,422 B2 | 1/2011 | McDonald |
| 7,891,103 B2 | 2/2011 | Mayor |
| 8,011,577 B2 | 9/2011 | Mullen et al. |
| 8,016,191 B2 | 9/2011 | Bonalle et al. |
| 8,037,758 B2 | 10/2011 | Sato |
| 8,056,412 B2 | 11/2011 | Rutkiewicz et al. |
| 8,061,049 B2 | 11/2011 | Mayor |
| 8,070,055 B2 | 12/2011 | Block et al. |
| 8,087,296 B2 | 1/2012 | Ueda et al. |
| 8,140,358 B1 | 3/2012 | Ling et al. |
| 8,148,808 B2 | 4/2012 | Braden et al. |
| 8,165,323 B2 | 4/2012 | Zhou |
| 8,181,874 B1 | 5/2012 | Wan et al. |
| 8,227,285 B1 | 7/2012 | Yang |
| 8,236,577 B1 | 8/2012 | Hsu |
| 8,245,923 B1 | 8/2012 | Merrill et al. |
| 8,250,921 B2 | 8/2012 | Nasiri et al. |
| 8,259,311 B2 | 9/2012 | Petschko et al. |
| 8,324,047 B1 | 12/2012 | Yang |
| 8,342,021 B2 | 1/2013 | Oshio |
| 8,367,522 B1 | 2/2013 | Yang |
| 8,395,252 B1 | 3/2013 | Yang |
| 8,395,381 B2 | 3/2013 | Lo |
| 8,402,666 B1 | 3/2013 | Hsu et al. |
| 8,407,905 B1 | 4/2013 | Hsu et al. |
| 8,421,082 B1 | 4/2013 | Yang |
| 8,476,084 B1 | 7/2013 | Yang et al. |
| 8,476,129 B1 | 7/2013 | Jensen et al. |
| 8,477,473 B1 | 7/2013 | Koury et al. |
| 8,486,723 B1 | 7/2013 | Wan et al. |
| 2001/0053565 A1 | 12/2001 | Khoury |
| 2002/0072163 A1 | 6/2002 | Wong et al. |
| 2002/0134837 A1 | 9/2002 | Kishon |
| 2003/0058069 A1 | 3/2003 | Schwartz et al. |
| 2003/0095115 A1 | 5/2003 | Brian et al. |
| 2003/0133489 A1 | 7/2003 | Hirota et al. |
| 2003/0184189 A1 | 10/2003 | Sinclair |
| 2003/0230802 A1 | 12/2003 | Poo et al. |
| 2004/0002808 A1 | 1/2004 | Hashimoto et al. |
| 2004/0016995 A1 | 1/2004 | Kuo et al. |
| 2004/0017644 A1 | 1/2004 | Goodwin-Johansson |
| 2004/0056742 A1 | 3/2004 | Dabbaj |
| 2004/0063325 A1 | 4/2004 | Urano et al. |
| 2004/0104268 A1 | 6/2004 | Bailey |
| 2004/0113246 A1 | 6/2004 | Boon |
| 2004/0119836 A1 | 6/2004 | Kitaguchi et al. |
| 2004/0140962 A1 | 7/2004 | Wang et al. |
| 2004/0177045 A1 | 9/2004 | Brown |
| 2004/0207035 A1 | 10/2004 | Witcraft et al. |
| 2004/0227201 A1 | 11/2004 | Borwick et al. |
| 2005/0074147 A1 | 4/2005 | Smith et al. |
| 2005/0090038 A1 | 4/2005 | Wallace |
| 2005/0174338 A1 | 8/2005 | Ing et al. |
| 2005/0199791 A1 | 9/2005 | Sengoku et al. |
| 2005/0247787 A1 | 11/2005 | Von Mueller et al. |
| 2006/0049826 A1 | 3/2006 | Daneman et al. |
| 2006/0081954 A1 | 4/2006 | Tondra et al. |
| 2006/0141786 A1 | 6/2006 | Boezen et al. |
| 2006/0168832 A1 | 8/2006 | Yasui et al. |
| 2006/0192465 A1 | 8/2006 | Kornbluh et al. |
| 2006/0208326 A1 | 9/2006 | Nasiri et al. |
| 2006/0211044 A1 | 9/2006 | Green |
| 2006/0238621 A1 | 10/2006 | Okubo et al. |
| 2006/0243049 A1 | 11/2006 | Ohta et al. |
| 2006/0274399 A1 | 12/2006 | Yang |
| 2007/0046239 A1 | 3/2007 | Hashizume |
| 2007/0132733 A1 | 6/2007 | Ram |
| 2007/0152976 A1 | 7/2007 | Townsend et al. |
| 2007/0181962 A1 | 8/2007 | Partridge et al. |
| 2007/0200564 A1 | 8/2007 | Motz et al. |
| 2007/0281379 A1 | 12/2007 | Stark et al. |
| 2008/0014682 A1 | 1/2008 | Yang et al. |
| 2008/0066547 A1 | 3/2008 | Tanaka et al. |
| 2008/0110259 A1 | 5/2008 | Takeno |
| 2008/0119000 A1 | 5/2008 | Yeh et al. |
| 2008/0123242 A1 | 5/2008 | Zhou |
| 2008/0210007 A1 | 9/2008 | Yamaji et al. |
| 2008/0211043 A1 | 9/2008 | Chen |
| 2008/0211113 A1 | 9/2008 | Chua et al. |
| 2008/0211450 A1 | 9/2008 | Yamada et al. |
| 2008/0277747 A1 | 11/2008 | Ahmad |
| 2008/0283991 A1 | 11/2008 | Reinert |
| 2009/0007661 A1 | 1/2009 | Nasiri et al. |
| 2009/0015251 A1 | 1/2009 | Azumi et al. |
| 2009/0049911 A1 | 2/2009 | Fukuda et al. |
| 2009/0108440 A1 | 4/2009 | Meyer et al. |
| 2009/0115412 A1 | 5/2009 | Fuse |
| 2009/0153500 A1 | 6/2009 | Cho et al. |
| 2009/0262074 A1 | 10/2009 | Nasiri et al. |
| 2009/0267906 A1 | 10/2009 | Schroderus |
| 2009/0307557 A1 | 12/2009 | Rao et al. |
| 2009/0321510 A1 | 12/2009 | Day et al. |
| 2010/0044121 A1 | 2/2010 | Simon et al. |
| 2010/0045282 A1 | 2/2010 | Shibasaki et al. |
| 2010/0071467 A1 | 3/2010 | Nasiri et al. |
| 2010/0075481 A1 | 3/2010 | Yang |
| 2010/0083756 A1 | 4/2010 | Merz et al. |
| 2010/0095769 A1* | 4/2010 | Matsumoto et al. ......... 73/504.12 |
| 2010/0109102 A1 | 5/2010 | Chen et al. |
| 2010/0171570 A1 | 7/2010 | Chandrahalim |
| 2010/0208118 A1 | 8/2010 | Ueyama |
| 2010/0236327 A1 | 9/2010 | Mao |
| 2010/0248662 A1 | 9/2010 | Sheynblat et al. |
| 2010/0260388 A1 | 10/2010 | Garrett et al. |
| 2010/0302199 A1 | 12/2010 | Taylor et al. |
| 2010/0306117 A1 | 12/2010 | Terayoko |
| 2010/0307016 A1 | 12/2010 | Mayor et al. |
| 2010/0312519 A1 | 12/2010 | Huang et al. |
| 2011/0131825 A1 | 6/2011 | Mayor et al. |
| 2011/0146401 A1 | 6/2011 | Inaguma et al. |

(56) References Cited

U.S. PATENT DOCUMENTS

| | | |
|---|---|---|
| 2011/0154905 A1 | 6/2011 | Hsu |
| 2011/0172918 A1 | 7/2011 | Tome |
| 2011/0183456 A1 | 7/2011 | Hsieh et al. |
| 2011/0265574 A1 | 11/2011 | Yang |
| 2011/0266340 A9 | 11/2011 | Block et al. |
| 2011/0312349 A1 | 12/2011 | Forutanpour et al. |
| 2012/0007597 A1 | 1/2012 | Seeger et al. |
| 2012/0007598 A1 | 1/2012 | Lo et al. |
| 2012/0215475 A1 | 8/2012 | Rutledge et al. |

OTHER PUBLICATIONS

Office Action for U.S. Appl. No. 12/945,087, mailed on Mar. 19, 2012, 6 pages.

\* cited by examiner

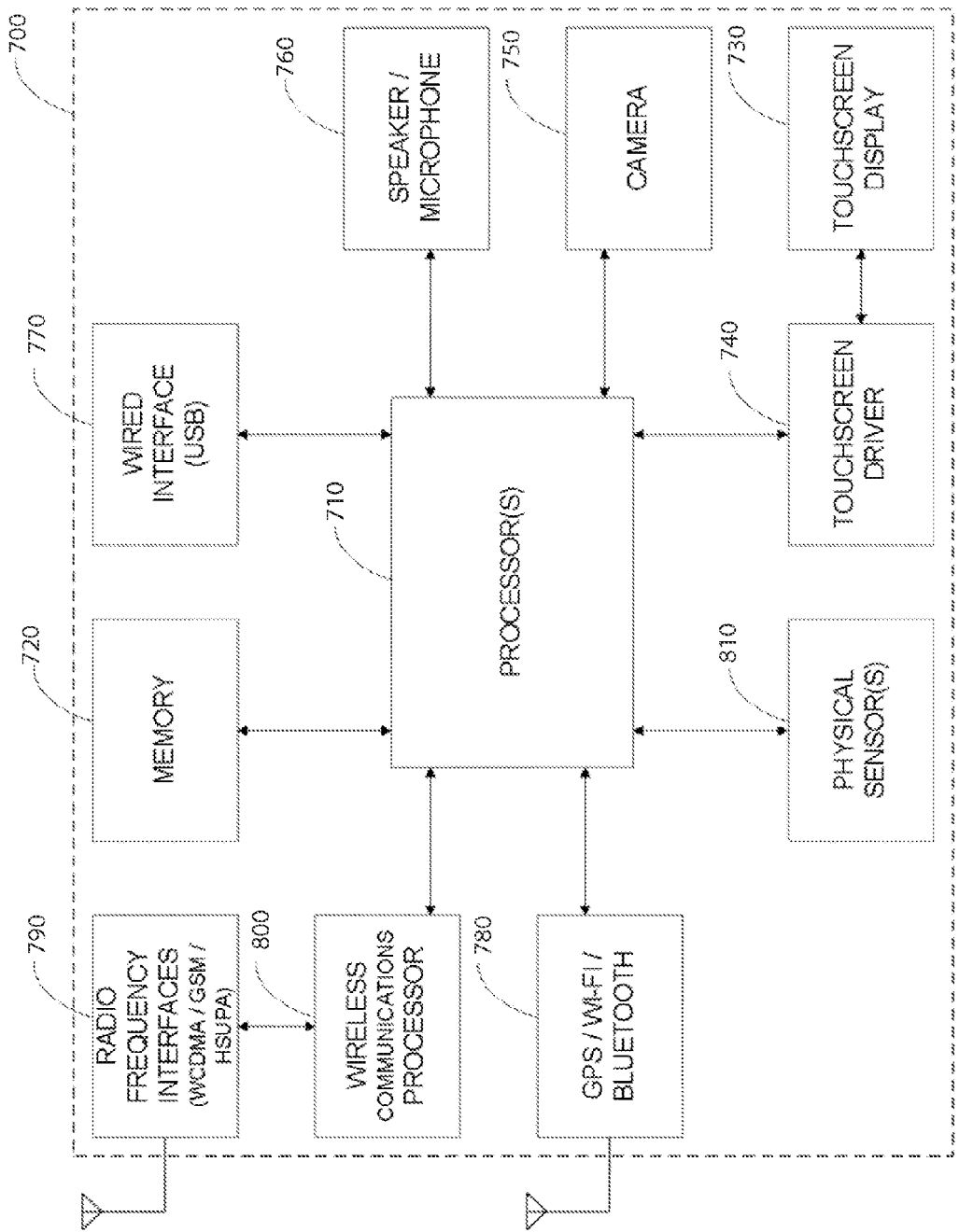

METHOD AND STRUCTURE OF AN INERTIAL SENSOR USING TILT CONVERSION

CROSS-REFERENCES TO RELATED APPLICATIONS

The present application claims priority to and incorporates by reference, for all purposes, the following patent application: U.S. Pat. App. No. 61/356,467, filed Jun. 18, 2010. The present invention also incorporates by reference, for all purposes, the following co-pending patent applications related to CMOS & MEMS devices and IC fabrication methodology: U.S. patent application Ser. No. 12/490,067, filed Jun. 23, 2009, U.S. patent application Ser. No. 12/717,070, filed Mar. 3, 2010, U.S. patent application Ser. No. 12/945,087, filed Nov. 12, 2010, U.S. Pat. App. No. 61/356,467, filed Jun. 18, 2010, and U.S. patent application Ser. No. 12/913,440, filed Oct. 27, 2010.

BACKGROUND OF THE INVENTION

Embodiments of the present invention relates generally to integrated devices. More particularly, embodiments of the present invention provides a method for fabricating an inertial sensing device using tilt conversion as well as a device using tilt conversion. More specifically, embodiments of the present invention provides a method and structure for forming movable structure(s) having flexible tilting member(s) overlying a substrate and coupling the movable structure(s) to frame structure(s) connected to anchor structure(s). Merely by way of example, the inertial sensing device can include at least an accelerometer, an angular rate sensor, an inertial sensor, and others. Additionally, the other applications include at least a sensor application or applications, system applications, and broadband applications, among others. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS technology has limitless applications through modular measurement devices such as accelerometers, angular rate sensors, actuators, and other sensors. In conventional vehicles, accelerometers and angular rate sensors are used to deploy airbags and trigger dynamic stability control functions, respectively. MEMS angular rate sensors can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

According to embodiments of the present invention, techniques related generally to integrated devices and systems are provided. More particularly, the embodiments of the present invention provide a method for fabricating an inertial sensing device using tilt conversion as well as a device using tilt conversion. The method can involve forming movable structures having flexible tilting members overlying a substrate and coupling the movable structures to the frame structures, which are connected to anchor structures. The resulting device can implement the flexible tilting members to assist in sensing out-of-plane tilting motions. Merely by way of example, the inertial sensing device(s) can include at least an accelerometer, an angular rate sensor, an inertial sensor, and others. It is believed that in light of the present patent disclosure, one of ordinary skill in the art will recognize that embodiments of the present invention have a much broader range of applicability.

In a specific embodiment, the method can include forming anchor structures coupled to one or more portions of the surface region of a substrate member. Flexible anchor members can be formed and coupled to the anchor structures and the frame structures, which can be formed overlying the substrate. Also, flexible frame members can be formed and coupled to the frame structures and the movable structures, which can also be formed overlying the substrate. The forming of the movable structures can include forming peripheral and central movable structures, both of which can be coupled to flexible structure members. The forming of the previously mentioned elements can include performing one or more etching processes on silicon materials or the like.

Embodiments of the device formed from the method above can be configured, for example, to convert a pure tilting out-of-plane motion to a pure translational out-of-plane motion. This conversion can be used to sense forces acting in the out-of-plane direction. The peripheral movable structures can be configured to convert tilting motion via the flexible tilting members. These flexible tilting members, as well as other flexible members, can include torsion springs or bending springs. The conversion of tilting motion can be used to detect weak displacements due to a Coriolis force. Furthermore, these device embodiments can be coupled to integrated circuits in an integrated CMOS-MEMS system, and can be further integrated with other sensors, communication systems, user interfaces, and the like.

Many benefits are achieved by way of the present invention over conventional techniques. For example, in various embodiments, the device can be configured to convert a pure tilting out-of-plane motion to a pure translational out-of-plane motion, to detect weak displacements due to a Coriolis force. Tilt motion conversion can improve inertial sensor performance and reliability while reducing cost. In some embodiments, the device can also be characterized with a higher quality factor, reduced damping, and reduced package size. Such benefits can improve the manufacturability of these kinds of inertial sensors.

Additionally, the present technique provides an easy to use process that relies upon conventional semiconductor fabrication technology. In various embodiments, the method provides a process and system that are compatible with conventional process technology without substantial modifications to conventional equipment and processes. In some embodiments, the inventors believe that the methods may result in higher device yields in terms of dies per wafer, with the integrated approach described herein.

Embodiments of the present invention provide for improved inertial sensor systems and related applications for a variety of uses. In one or more embodiments, the present invention provides for all MEMS and related applications, which may be integrated on one or more integrated circuit device structures. Depending upon the embodiment, one or more of these benefits may be achieved. Various additional objects, features and advantages of embodiments of the present invention can be more fully appreciated with reference to the detailed description and accompanying drawings that follow

BRIEF DESCRIPTION OF THE DRAWINGS

The diagrams disclosed in the present patent application are merely implementation examples, which should not unduly limit the scope of the claims herein. It should be understood that the examples and embodiments described herein are for illustrative purposes only and that various modifications or changes in light thereof will be suggested to persons skilled in the art and are to be included within the spirit and purview of this process and scope of the appended claims.

FIG. 7 is a simplified block diagram of various embodiments according to an embodiment of the present invention.

DETAILED DESCRIPTION OF THE INVENTION

Embodiments of the present invention relates generally to integrated devices. More particularly, embodiments of the present invention provides a method for fabricating an inertial sensing device using tilt conversion as well as a device using tilt conversion. More specifically, embodiments of the present invention provides a method and structure for forming movable structure(s) having flexible tilting member(s) overlying a substrate and coupling the movable structure(s) to frame structure(s) connected to anchor structure(s). Merely by way of example, the inertial sensing device can include at least an accelerometer, an angular rate sensor, an inertial sensor, and others. Additionally, the other applications include at least a sensor application or applications, system applications, and broadband applications, among others. But it will be recognized that the invention has a much broader range of applicability.

Figure 1:
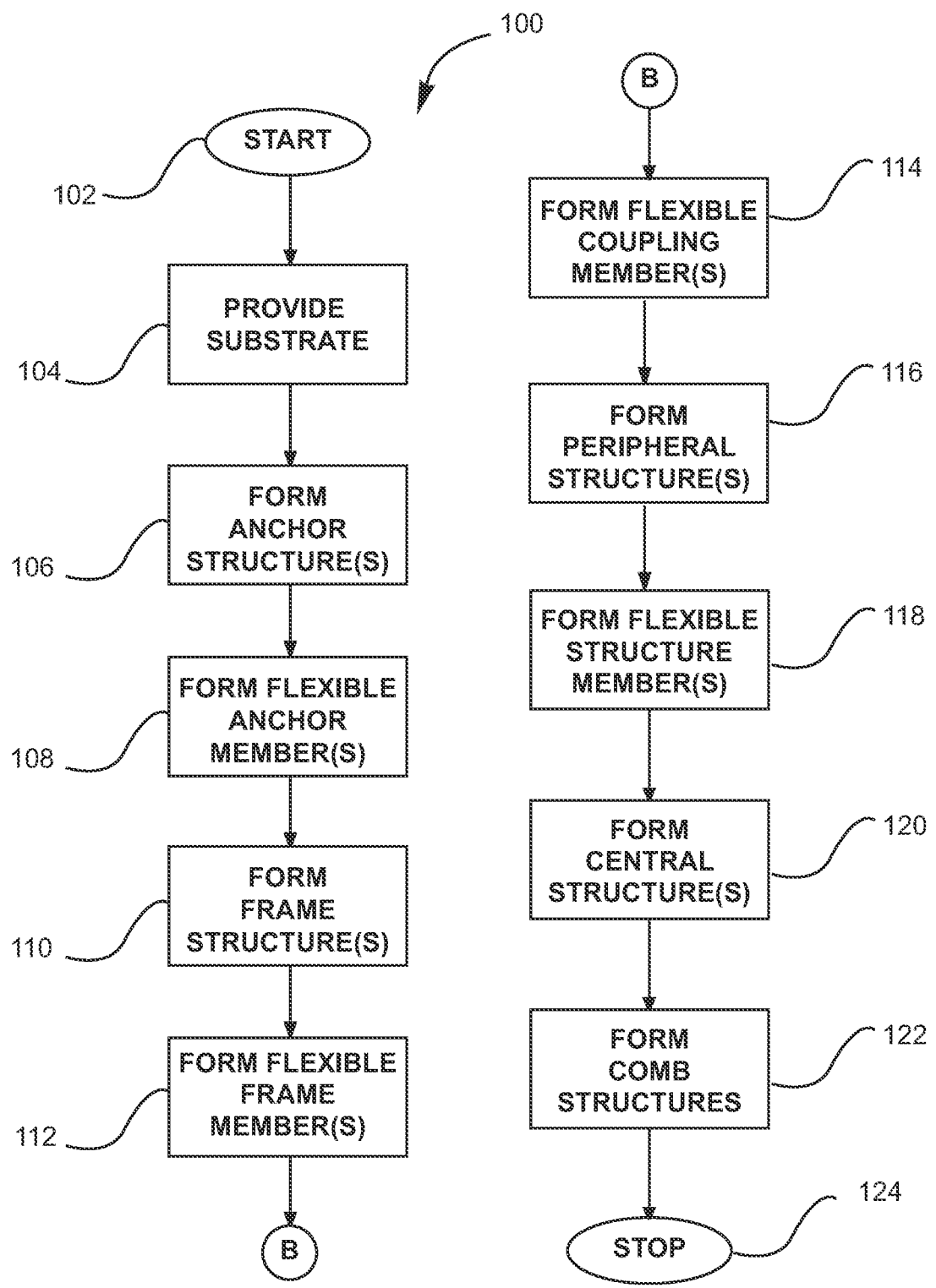
FIG. 1 is a simplified flow diagram of a method for fabricating an inertial sensing device according to an embodiment of the present invention.

FIG. 1 is a simplified flow diagram illustrating methods of fabricating an inertial sensor using tilt conversion according to an embodiment of the present invention.

As shown in FIG. 1, embodiments of a manufacturing process are illustrated. Various steps are also outlined below.

1. Start;
2. Provide a substrate having a surface region;
3. Form anchor structure(s) coupled to portion(s) of the surface region;
4. Form flexible anchor member(s) coupled to portion(s) of the anchor structure(s);
5. Form frame structure(s) having portion(s) coupled to the flexible anchor member(s);
6. Form flexible frame member(s) coupled to portions of the frame structure(s);
7. Form peripheral movable structure(s) having portions coupled to the flexible frame member(s);
8. Form flexible structure member(s) coupled to portions of the peripheral movable structure(s);
9. Form central movable structure(s) having portion(s) coupled to the flexible structure member(s);
10. Form flexible coupling member(s) coupled to portions of the frame structure(s);
11. Form comb structure(s) coupled to portions of the frame structure(s); and
12. Stop.

These steps are merely examples and should not unduly limit the scope of the claims herein. As shown, the above methods provide a way of fabricating an inertial sensing device using tilt conversion according to an embodiment of the present invention.

As shown in FIG. 1, an embodiment of method 100 begins at start, step 102. This embodiment is a fabrication method for forming an inertial sensing device using tilt conversion to sense an out-of-plane force. Many benefits are achieved by way of the present invention over conventional techniques. A device manufactured by embodiments of the present method can be characterized with a higher quality factor, reduced damping, and reduced package size. Additionally, the present technique provides an easy to use process that relies upon conventional semiconductor fabrication technology. Using the conventional process technology without substantial modifications can improve device manufacturability. In some embodiments, the inventors believe that the methods may result in higher device yields, in terms of dies per wafer, with the integrated approach described herein.

Following step 102, embodiment 100 includes providing a substrate having a surface region, step 104. In a specific embodiment, the substrate can be a buried oxide (BOX) substrate, having an integrally formed oxide layer formed or fabricated within the bulk silicon material. The substrate can also include an epitaxial (EPI) material, such as a monocrystalline film that is deposited on a monocrystalline substrate. In various embodiments, the substrate can have silicon, single crystal silicon, or polycrystalline silicon materials. Other material layers that can be formed overlying the substrate can include dielectric materials, metal materials, metal alloys, or other materials or combination of materials thereof. These materials can be formed as an integrated circuit (IC) layer, such as a CMOS device layer, that is spatially disposed overlying the substrate. Those skilled in the art will recognize other variations, modifications, and alternatives of processing substrate materials and IC materials.

In various embodiments, the substrate have an associated surface region. At least one anchor structure can be formed overlying the surface region, step 106. At least one flexible anchor member can be formed and coupled to at least a portion of the anchor structure(s), step 108. Also, the anchor structure(s) and flexible anchor member(s) can include a silicon, dielectric, metal, alloy, or other materials or combination thereof. In a specific embodiment, the flexible anchor members can include torsion spring(s) or bending spring(s). Furthermore, the anchor structure(s) and flexible anchor member(s) can be formed using the same fabrication process together or separately by performing a wet or dry etching or mechanical process. Of course, there can be other variations, modifications, and alternatives.

At least one frame structure can be formed having at least a portion coupled to flexible anchor member(s), step 110. At least one flexible frame member can be formed and coupled to at least a portion of the frame structure(s), step 112. In embodiments wherein more than one frame structure is to be formed, at least one flexible coupling member can be formed to couple the frame structure(s), step 114. In various embodiments, the frame structure(s), flexible coupling member(s) and flexible frame member(s) can include a silicon, dielectric, metal, alloy, or other materials or combinations thereof.

In various embodiments, the flexible frame member(s) and flexible coupling member(s) can include torsion spring(s) or bending spring(s). Similar to the anchor elements, the frame structure(s), flexible coupling member(s), and flexible frame member(s) can be formed using the same fabrication process or separately by performing a wet or dry etching or mechanical process. As stated previously, there can be other variations, modifications, and alternatives.

Figure 2:
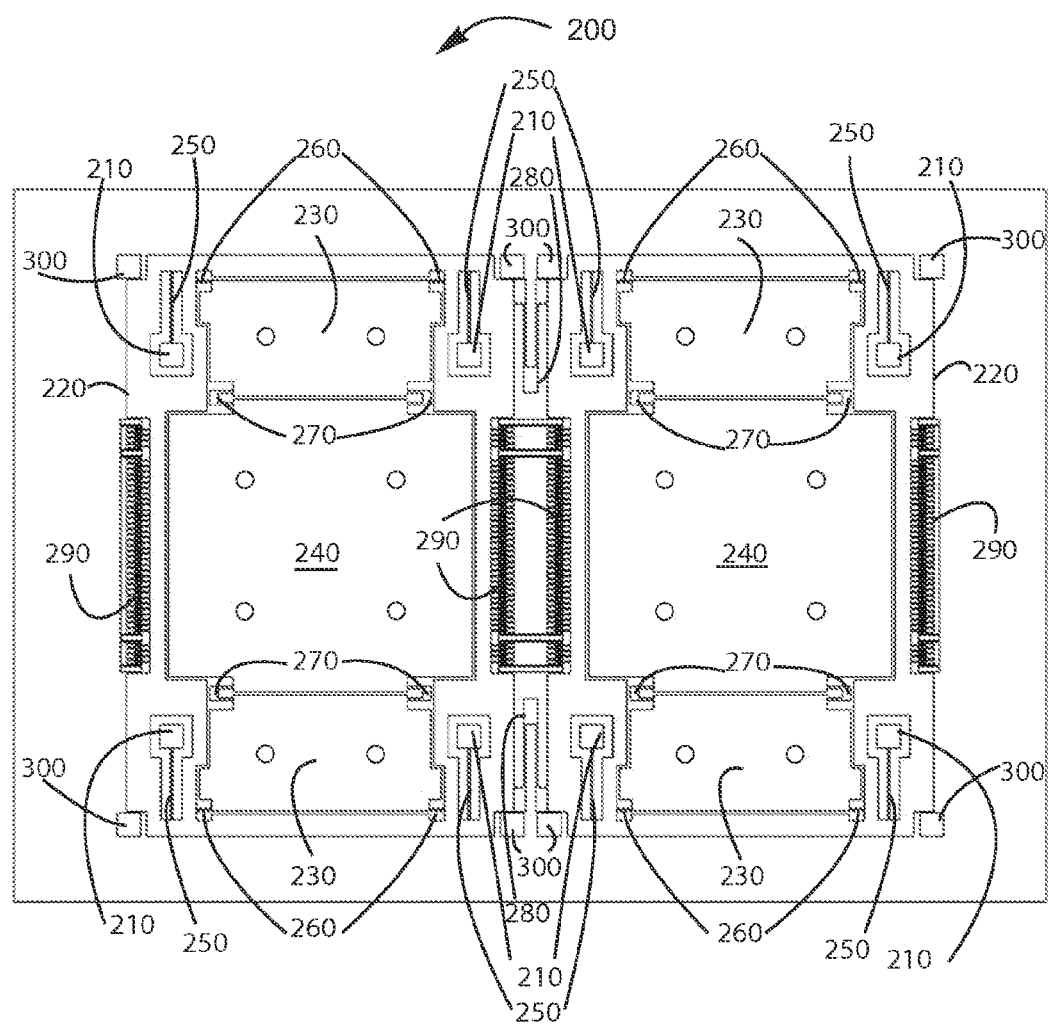
FIG. 2 is a simplified top diagram of an inertial sensing device according to an embodiment of the present invention.

In various embodiments, at least one peripheral movable structure can be formed overlying the substrate, having at least one portion coupled to flexible frame member(s), step 116. The peripheral movable structure(s) can have at least one flexible tilting member. At least one flexible structure member can be formed and coupled to at least a portion of peripheral movable structure(s), step 118. The flexible structure member(s) can be coupled to at least a central movable structure, step 120. As illustrated in FIG. 2, a central movable structure and a peripheral movable structure can be spaced apart, e.g. have at least one portion removed from there between. In an example, the central movable structure and the peripheral movable structure are delineated by perforations or an array or perforations. In various embodiments, such perforations, or the like are formed by performing an etching process or mechanical process, as discussed below.

In various embodiments, the peripheral movable structure, the central movable structure, the flexible structure and the tilting member(s) can include a silicon, dielectric, metal, alloy, or other materials or combinations thereof. More specifically, the flexible structure and tilting member(s) can include torsion spring(s) or bending spring(s). Other torsion springs or bending springs can also be formed within at least one portion of the central movable structure(s), such as the underside of the central movable structure which overlies the substrate.

In various embodiments, the movable structures can be formed within the frame structure(s). For example, as illustrated in various of the figures below, four peripheral movable structures and two central movable structures can be formed within two frame structures; each of the frame structures are coupled to two peripheral movable structures and one central movable structure. Also, the peripheral and central movable structure(s) and the flexible structure and tilting member(s) can be formed using the same fabrication process or separately by performing a wet or dry etching or mechanical process. Again, there can be other variations, modifications, and alternatives.

At least one comb structure can be formed and coupled to at least a frame structure(s), step 122. In a specific embodiment, the comb structure(s) can be anti-phase driving comb structure(s), which can include a silicon, dielectric, metal, alloy, or other materials or combinations thereof. In various embodiments, the comb structures (s) can be formed using the same fabrication process, or separately, by performing a wet or dry etching process on one wafer or material. Of course, there can be other variations, modifications, and alternatives.

The above processes provide a fabrication method for forming an inertial sensing device using tilt conversion according to an embodiment of the present invention. As shown, the method uses a combination of steps including providing a substrate, forming anchor(s), flexible member(s), and movable structure(s) that include flexible tilting member(s). Other alternatives can also be provided where steps are added, one or more steps are removed, or one or more steps are provided in a different sequence or are performed at the same time, without departing from the scope of the claims herein. Further details of the present method can be found throughout the present specification.

FIG. 2 is a simplified top diagram of an inertial sensing device according to various embodiments of the present invention. As shown, device 200, which can be disposed upon a substrate having a surface region, includes at least one anchor structure 210, at least one frame structure 220, at least one movable structure, at least one first flexible member, and at least one second flexible member. In an embodiment, the movable structure(s) can include at least one peripheral movable structure 230 and at least one central movable structure 240. The first flexible member(s) can include flexible anchor member(s) 250 and the second flexible member(s) can include at least one flexible frame member 260 and/or at least one flexible structure member 270. Those of ordinary skill in the art will recognize other variations, modifications, and alternatives.

Many benefits are achieved by way of the present invention over conventional techniques. For example, in various embodiments, the device can be configured to convert a pure tilting out-of-plane motion to a pure translational out-of-plane motion, to detect weak displacements due to a Coriolis force. In specific embodiments, a tilt motion conversion can improve inertial sensor performance. In some embodiments, the device can also be characterized with a higher quality factor, reduced damping, and reduced package size. These benefits, as well as others, will be recognized by those skilled in the art from the device embodiments described below.

In a specific embodiment, the substrate can include a buried oxide (BOX) substrate, having an oxide layer integrally formed or fabricated within a bulk substrate material. The substrate can include an epitaxial (EPI) material, such as a monocrystalline film that is deposited overlying a monocrystalline substrate. The substrate can have silicon, single crystal silicon, or polycrystalline silicon materials. Other material layers formed overlying the substrate can include dielectric materials, metal materials, metal alloys, or other materials or combination of materials thereof. Furthermore, the substrate can have an integrated circuit layer, such as a CMOS device layer, formed overlying the substrate. Those skilled in the art will recognize other variations, modifications, and alternatives.

In various embodiments, the substrate includes a surface region. At least one anchor structure 210 can be formed overlying the surface region. At least one flexible anchor member 250 is coupled to at least a portion of the anchor structure(s). These anchor structure(s) 210 and flexible anchor member(s) 250 can include a silicon, dielectric, metal, alloy, or other materials or combination thereof. In a specific embodiment, flexible anchor members 250 can include torsion spring(s) or bending spring(s). Also, anchor structure(s) 210 and flexible anchor member(s) 250 can be formed together during the same fabrication processes or separately by performing a wet or dry etching or mechanical process. Of course, there can be other variations, modifications, and alternatives.

In an embodiment, frame structure(s) 220 can be formed having at least a portion coupled to flexible anchor member(s) 250. Flexible frame member(s) 260 can be formed and coupled to at least a portion of frame structure(s) 220. In embodiments wherein more than one frame structure 220 is formed, at least one flexible coupling member 280 can be formed to couple frame structure(s) 220. Also, frame structure(s) 220, flexible coupling member(s) 280 and flexible frame member(s) 260 can include a silicon, dielectric, metal, alloy, or other materials or combinations thereof. In a specific embodiment, flexible frame member(s) 260 and flexible coupling member(s) 280 can include torsion spring(s) or bending spring(s). Similar to anchor elements, frame structure(s) 220, flexible coupling member(s) 280, and flexible frame member(s) 260 can be formed together during the same fabrication processes or separately by performing a wet or dry etching or mechanical process. As stated previously, there can be other variations, modifications, and alternatives.

In various embodiments, peripheral movable structure(s) 230 can be formed overlying the substrate, having at least one portion coupled to flexible frame member(s) 260. The movable structure(s), which can be peripheral movable structure(s) 230, can have at least one flexible tilting member. Flexible structure member(s) 270 can be formed and coupled to at least a portion of peripheral movable structure(s) 230. Also, flexible structure member(s) 270 can be coupled to central movable structure(s) 240, which can be formed overlying the substrate. In various embodiments, peripheral movable structure 230, central movable structure 240, flexible structure and tilting member(s) (referring to flexible structure member(s) 270) can include a silicon, dielectric, metal, alloy, or other materials or combinations thereof. In a specific embodiment, the flexible structure and tilting member(s) (referring to flexible structure member(s) 270) can include torsion spring(s) or bending spring(s). Other torsion springs or bending springs can also be formed within at least one portion of central movable structure(s) 240, such as the underside of central movable structure(s) 240 which overlies the substrate.

The movable structures can be formed within frame structure(s) 220. In the example illustrated in FIG. 2, four peripheral movable structures 230 and two central movable structures 240 are shown formed within two frame structures 220. Each frame structure 220 is coupled to two peripheral movable structures 230 and one central movable structure 240. The peripheral and central movable structures 230/240 can be proof masses, which can be predetermined test masses used in a measuring device. In further embodiments, the peripheral and central movable structure(s) 230/240 and the flexible structure and tilting member(s) [referring to flexible structure member(s) 270] can be formed together or separately by performing a wet or dry etching or mechanical process. Again, there can be other variations, modifications, and alternatives.

At least one comb structure 290 can be formed and coupled to at least one portion of frame structure(s) 220. In various embodiments, comb structure(s) 290 can be anti-phase driving comb structure(s), which can include a silicon, dielectric, metal, alloy, or other materials or combinations thereof. Additionally, the peripheral and central movable structure(s) 230/240 can have stop structures 300, which can be used to set the boundaries of any vibration, movement, or displacement. A portion of peripheral movable structure 230 and central movable structure 240 may be removed by a mechanical or etching process. Furthermore, peripheral movable structure 230 and central movable structure 240 can have perforations within a line or an array of perforations. These perforations can be formed by performing an etching process or mechanical process. In a specific embodiment, all elements mentioned previously can be formed by performing an etching process on one wafer or material. Of course, there can be other variations, modifications, and alternatives.

Figure 3:
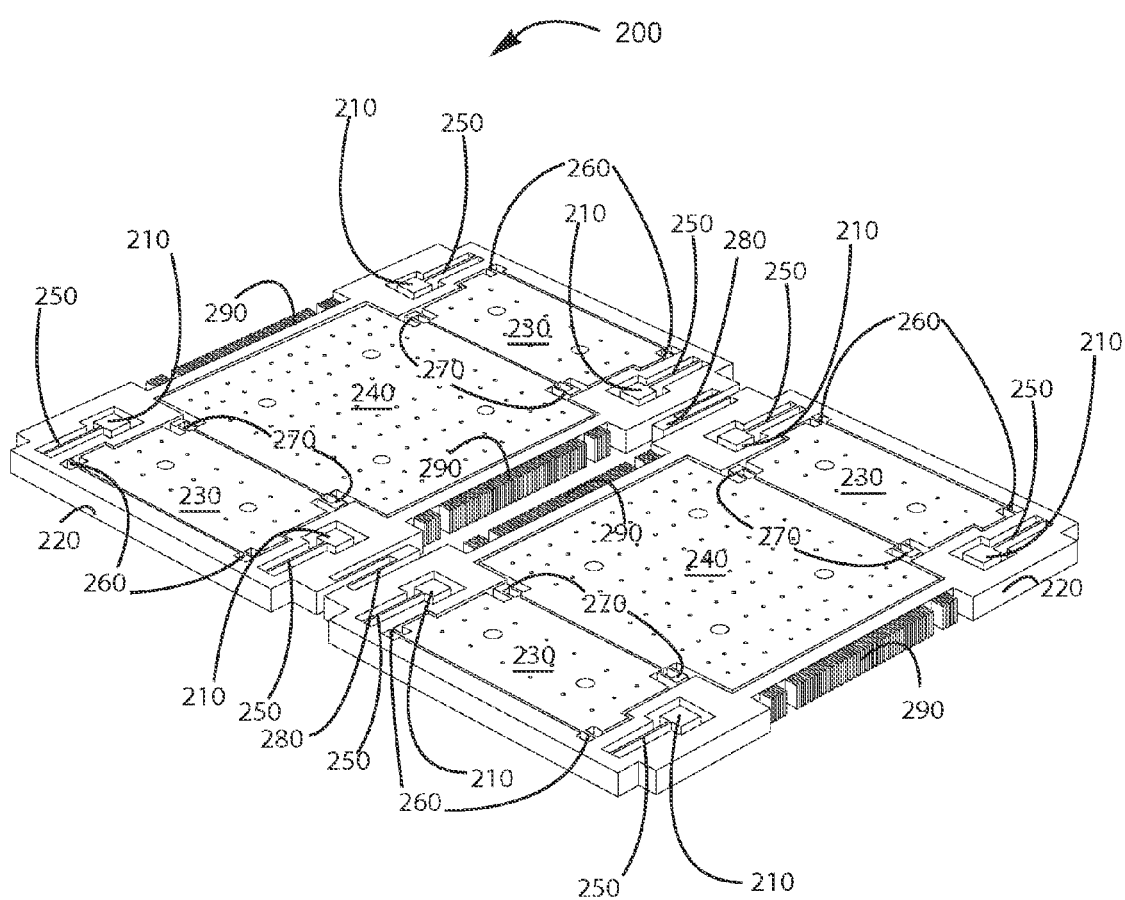
FIG. 3 is a simplified perspective diagram of an inertial sensing device according to an embodiment of the present invention.

FIG. 3 is a simplified perspective diagram of an inertial sensing device according to an embodiment of the present invention. As shown, device 200, which can be disposed upon a substrate having a surface region, includes at least one anchor structure 210, at least one frame structure 220, at least one movable structure, at least one first flexible member, and at least one second flexible member. In an embodiment, the movable structure(s) can include at least one peripheral movable structure 230 and at least one central movable structure 240. The first flexible member(s) can include flexible anchor member(s) 250 and the second flexible member(s) can include at least one flexible frame member 260 and/or at least one flexible structure member 270. A detailed description regarding the structure and the elements of device 200 can be found above in the description for FIG. 2. Of course, those of ordinary skill in the art will recognize other variations, modifications, and alternatives.

In various embodiments, inertial sensing device 200 can be an angular rate sensor or a MEMS angular rate sensor. The operation of inertial sensing device 200 can be similar to that of a vibrating structure angular rate sensor, also known as a Coriolis vibrating gyro. The theory of operation involves the tendency of a vibrating object, or proof mass, to maintain the vibration in the same plane as the object is rotated. In a specific embodiment, inertial sensing device 200 can be configured such that movable structures 230/240 vibrate along a single axis in a single plane. When device 200 is subjected to a rotation in the perpendicular direction within the same plane, there is a resulting Coriolis force that causes movable structures 230/240 to be displaced in a direction normal to the vibration plane. The direction of the Coriolis force is determined by the cross product of the direction of the vibration and the direction of the rotation.

For example, consider the scenario in which movable structures 230/240 were vibrating in the X-Y plane along the x-axis. If device 200 experiences a rotation about the y-axis direction, the resulting Coriolis force would be experienced along the z-axis. Movable structures 230/240 would become displaced along the z-axis, the direction being determined by the right hand rule. In various embodiments of the present invention, one or more sensors may be added such that the magnitude of the displacement as a result of these cross products can then be measured. The measured displacement can then be provided to another system for determination of the rate of angular change, or one or more circuits may be implemented in the CMOS device layer referred to above, that in turn may calculate the rate of angular change.

In various embodiments, the use of peripheral movable structures 230 with flexible tilting members allows device 200 to convert a tilting out-of-plane motion to a translational out-of-plane motion, using the weak displacements due to the Coriolis force. In specific implementations, the displacement of movable structures 230/240 can be detected through electrodes or capacitor elements disposed on at least a portion of the movable structures 230/240 and at least a portion of the substrate member. Though FIGS. 2 and 3 demonstrates a particular configuration of the structural elements discussed above, those of ordinary skill in the art will recognize other variations, modifications, and alternatives.

FIG. 3, like FIG. 2, illustrates a differential configuration. Having two frame structures 220 coupled to movable structures 230/240 configures device 200 as two differential units coupled by flexible coupling member(s) 280. Comb structure(s) 290 assist the operation of the differential configuration by providing the anti-phase drive capability. During operation, the two units can vibrate in opposite directions of each other along the same axis (anti-phase). This differential embodiment achieves a better common mode rejection ratio, which results in better accuracy of inertial sensing device 200. Additionally, many of the other structural elements provide performance enhancing benefits. The perforations mentioned in the description of FIG. 2 improve device performance by reducing damping and increasing quality factor due to the reduction of mass. Those of ordinary skill in the art will recognize these and other benefits from the device embodiments described, as well as from variations, modifications, and alternatives.

In various embodiments, device 200 is configured to have an in-plane drive mode, that signifies that the device will vibrate parallel to the substrate member on which device 200 is coupled by anchor member(s) 210. The in-plane drive configuration experiences much less damping (slide film damping) compared to out-of-plane drive configuration (squeeze film damping). The in-plane drive configuration also requires a much smaller package, lower drive voltage, and better quality factor compared to an out-of-plane drive configuration.

Additionally, device 200 can be configured to operate with different drive mode and sense mode frequencies, which means that the frequency of the vibration during operation is different from the frequency of the displacement sensing of the Coriolis force. In some embodiments, the drive mode can be configured to be about 27 Hz, whereas the sensing frequency can be about 30 Hz. However, there can be other combination of frequencies used for either the drive or sense mode. Though the embodiments of device 200 demonstrate specific configurations of the structural elements, those skilled in the art will recognize other variations, modifications, or alternatives.

Figure 4:
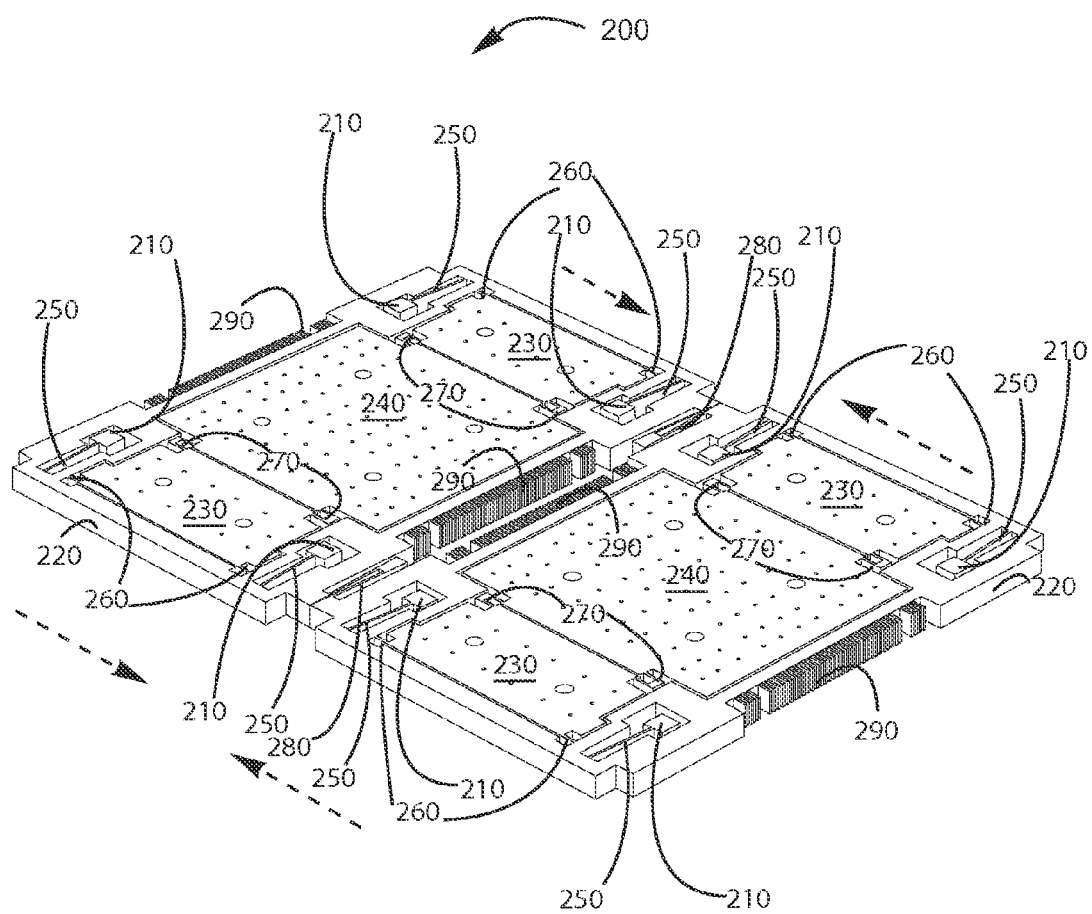
FIG. 4 is a simplified perspective diagram of an inertial sensing device according to an embodiment of the present invention.

FIG. 4 is a simplified perspective diagram of an inertial sensing device according to an embodiment of the present invention. As shown, device 400 represents a device similar to that of device 200, as in FIGS. 2 and 3, operating in a differential drive mode and having the two vibrating units moving toward each other. Flexible anchor members 250 are shown to be bending as device 400 moves about anchor structure(s) 210. Flexible coupling member(s) 280 are also shown being compressed. A detailed description regarding the structure and the elements of device 200 can be found above in the description for FIG. 2. Of course, those of ordinary skill in the art will recognize other variations, modifications, and alternatives.

Figure 5:
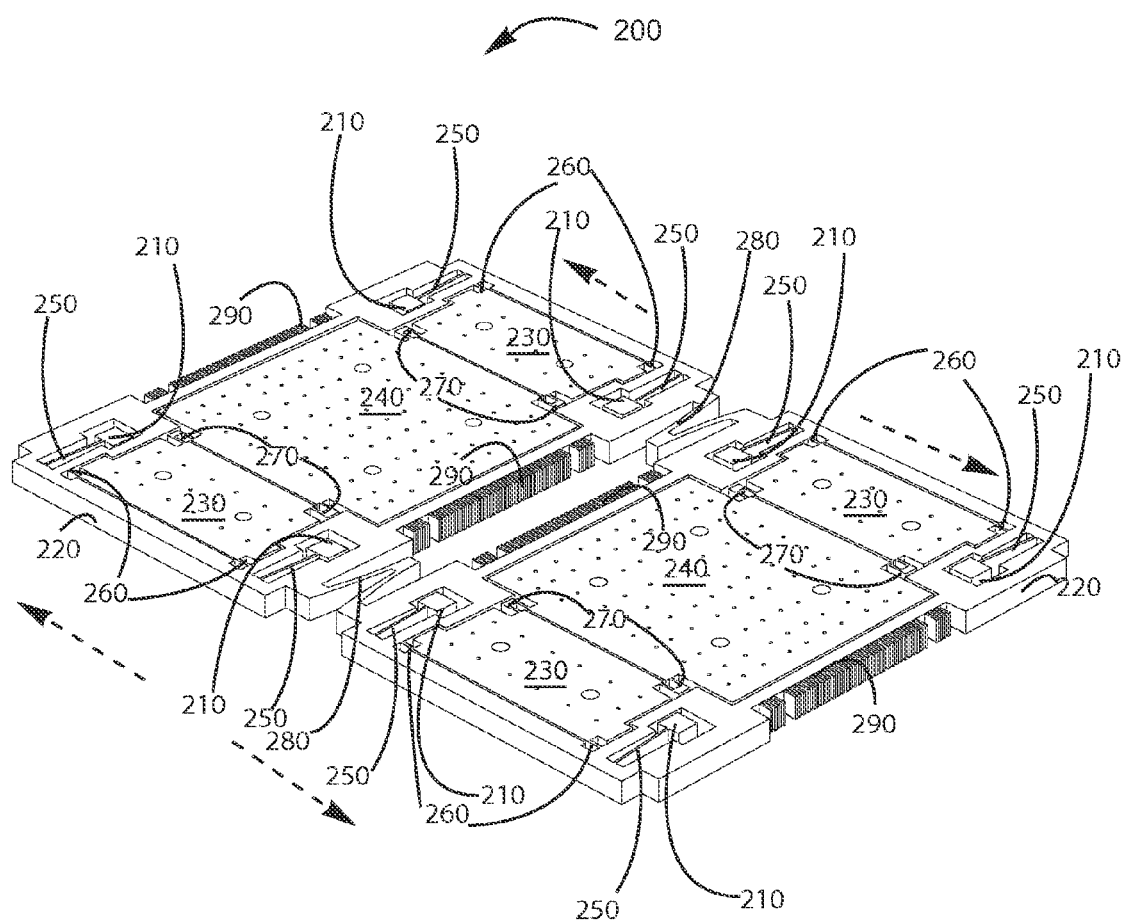
FIG. 5 is a simplified perspective diagram of an inertial sensing device according to an embodiment of the present invention.

FIG. 5 is a simplified perspective diagram of an inertial sensing device according to an embodiment of the present invention. As shown, device 500 represents a device similar to that of device 200, as in FIGS. 2 and 3, operating in a differential drive mode and having the two vibrating units moving away from each other. Flexible anchor members 250 are shown to be bending as device 400 moves about anchor structure(s) 210. Flexible coupling member(s) 280 are also shown being expanded. A detailed description regarding the structure and the elements of device 200 can be found above in the description for FIG. 2. Of course, those of ordinary skill in the art will recognize other variations, modifications, and alternatives.

Figure 6:
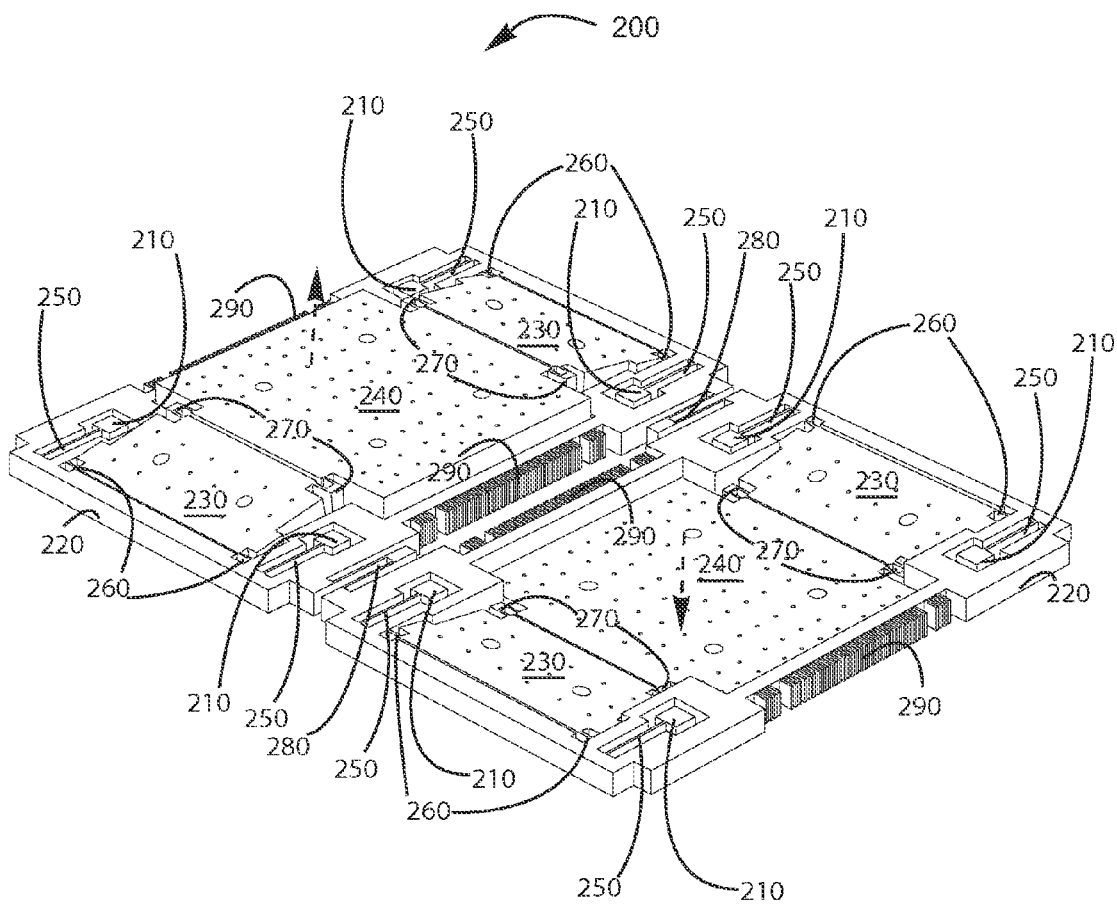
FIG. 6 is a simplified perspective diagram of an inertial sensing device according to an embodiment of the present invention.

FIG. 6 is a simplified perspective diagram of an inertial sensing device according to an embodiment of the present invention. As shown, device 600 represents a device similar to that of device 200, as in FIGS. 2 and 3, operating in a differential sense mode and having the differential units, including frame structure(s) 220 and movable structures 230/240, being displaced in opposite directions. Central movable structure(s) 240 are shown moving in an out-of-plane direction normal to the drive plane. Peripheral movable structure(s) 230 are shown converting a pure tilting out-of-plane motion to a pure translational out-of-plane motion of central movable structure 240. A detailed description regarding the structure and the elements of device 200 can be found above in the description for FIG. 2. Of course, those of ordinary skill in the art will recognize other variations, modifications, and alternatives.

Although the inertial sensing device described within FIG. 1 and shown within FIGS. 2-6 are configured to detect in a single axis, further embodiments may include combining device 200 with at least one other inertial sensing device. For example, one inertial sensing device may vibrate in the z-direction, and another inertial sensing device may vibrate in the x-direction. In another embodiment, the device disclosed within this specification can be integrated as part of a 3-axis inertial sensing device; accordingly, one device may vibrate in the x-direction, one in the y-direction, and one in the z-direction.

In still other embodiments, these inertial sensing devices may also be combined with other sensors, such as accelerometers, magnetic sensors, pressure sensors, or the like. For example, these inertial sensing devices may be combined with x, y, z accelerometers to form a six-axis device. Again, those skilled in the art will recognize many other variations, modifications, and alternatives.

FIG. 7 illustrates a functional block diagram of various embodiments of the present invention. These embodiments can be various software applications, which provide system-level support of the embodiments disclosed in FIGS. 2-6. In FIG. 7, a computing device 700 typically includes an applications processor 710, memory 720, a touch screen display 730 and driver 740, an image acquisition device 750, audio input/output devices 760, and the like. Additional communications from and to computing device are typically provided by via a wired interface 770, a GPS/Wi-Fi/Bluetooth interface 780, RF interfaces 790 and driver 800, and the like. Also included in various embodiments are physical sensors 810.

In various embodiments, computing device 800 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 700 may include one or more processors 810. Such processors 810 may also be termed application processors, and may include a processor core, a video/graphics core, and other cores. Processors 710 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 720 may include different types of memory (including memory controllers), such as flash memory (e.g. NOR, NAND), pseudo SRAM, DDR SDRAM, or the like. Memory 720 may be fixed within computing device 700 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 730 and driver 740 may be based upon a variety of later-developed or current touch screen technology including resistive displays, capacitive displays, optical sensor displays, electromagnetic resonance, or the like. Additionally, touch screen display 730 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 750 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 760 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 710 to enable the user to operate computing device 700 by stating voice commands. Additionally, a speech engine may be provided in various embodiments to enable computing device 700 to provide audio status messages, audio response messages, or the like.

In various embodiments, wired interface 770 may be used to provide data transfers between computing device 700 and an external source, such as a computer, a remote server, a storage network, another computing device 700, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 780 may also be provided to provide wireless data transfers between computing device 700 and external sources, such as computers, storage networks, headphones, microphones, cameras, or the like. As illustrated in FIG. 7, wireless protocols may include Wi-Fi (e.g. IEEE 802.11 a/b/g/n, WiMax), Bluetooth, IR and the like.

GPS receiving capability may also be included in various embodiments of the present invention, however is not required. As illustrated in FIG. 7, GPS functionality is included as part of wireless interface 780 merely for sake of convenience, although in implementation, such functionality is currently performed by circuitry that is distinct from the Wi-Fi circuitry and distinct from the Bluetooth circuitry.

Additional wireless communications may be provided via RF interfaces 790 and drivers 800 in various embodiments. In various embodiments, RF interfaces 790 may support any future-developed or conventional radio frequency communications protocol, such as CDMA-based protocols (e.g. WCDMA), GSM-based protocols, HSUPA-based protocols, or the like. In the embodiments illustrated, driver 800 is illustrated as being distinct from applications processor 710. However, in some embodiments, these functionality are provided upon a single IC package, for example the Marvel PXA330 processor, and the like. It is contemplated that some embodiments of computing device 700 need not include the RF functionality provided by RF interface 790 and driver 800.

FIG. 7 also illustrates computing device 700 to include physical sensors 810. In various embodiments of the present invention, physical sensors 810 are multi-axis Micro-Electro-Mechanical Systems (MEMS) based devices being developed by M-cube, the assignee of the present patent application. Physical sensors 810 developed by M-cube currently includes very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof. As described in the patent applications referenced above, various embodiments of physical sensors 810 are manufactured using a foundry-compatible process. As explained in such applications, because the process for manufacturing such physical sensors can be performed on a standard CMOS fabrication facility, it is expected that there will be a broader adoption of such components into computing device 700. In other embodiments of the present invention, conventional physical sensors 810 from Bosch, STMicroelectronics, Analog Devices, Kionix or the like.

In various embodiments, any number of future developed or current operating systems may be supported, such as iPhone OS (e.g. 4.0), WindowsMobile (e.g. 7), Google Android (e.g. 2.1), Symbian, or the like. In various embodiments of the present invention, the operating system may be a multi-threaded multi-tasking operating system. Accordingly, inputs and/or outputs from and to touch screen display 730 and driver 740 and inputs/or outputs to physical sensors 810 may be processed in parallel processing threads. In other embodiments, such events or outputs may be processed serially, or the like. Inputs and outputs from other functional blocks may also be processed in parallel or serially, in other embodiments of the present invention, such as image acquisition device 750 and physical sensors 810.

FIG. 7 is representative of one computing device 700 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 7. For example, in various embodiments, computing device 700 may lack image acquisition unit 750, or RF interface 790 and/or driver 800, or GPS capability, or the like. Additional functions may also be added to various embodiments of computing device 700, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Embodiments of the present invention provide for improved inertial sensor systems and related applications for a variety of uses. In one or more embodiments, the present invention provides for all MEMS and related applications, which may be integrated on one or more integrated circuit device structures. Depending upon the embodiment, one or more of these benefits may be achieved.

These diagrams are merely examples, which should not unduly limit the scope of the claims herein. In light of the present invention disclosure, one of ordinary skill in the art would recognize many other variations, modifications, and alternatives. For example, various steps outlined above may be added, removed, modified, rearranged, repeated, and/or overlapped, as contemplated within the scope of the invention. It is also understood that the examples and embodiments described herein are for illustrative purposes only and that various modifications or changes in light thereof will be suggested to persons skilled in the art and are to be included within the spirit and purview of this process and scope of the appended claims.

What is claimed is:

1. An inertial sensing device disposed upon a substrate member having a surface region, the device comprising:
   eight anchor structures, the anchor structures being coupled to at least one portion of the surface region;
   two frame structures, the frame structures spatially disposed overlying at least one portion of the surface region, each of the frame structures being coupled to four of the anchor structure(s);
   four peripheral movable structures, the peripheral movable structures spatially disposed overlying at least one portion of the surface region, each of the peripheral movable structures having two flexible tilting members;
   two central movable structures, the central movable structures having at least one portion coupled to each of the flexible tilting members of two peripheral movable structures;
   eight first flexible members, each of the first flexible members being coupled to one of the anchor structures and at least one portion of the frame structures; and
   eight second flexible members, two of the second flexible members being coupled to at least one portion of the frame structure(s) and each of the peripheral movable structures.

2. The device of claim 1 further comprising an integrated circuit layer, the integrated circuit layer being formed overlying at least one portion of the surface region.

3. The device of claim 1 further comprising two flexible coupling members, the flexible coupling members being coupled to at least one portion of each of the frame structures.

4. The device of claim 3 wherein the flexible coupling member(s), the flexible tilting member(s), and the first and second flexible member(s) comprise torsion spring(s) or bending spring(s).

5. The device of claim 1 further comprising at least one comb structure, the comb structure(s) being coupled to at least one portion of the frame structure(s).

6. The device of claim 5 wherein the comb structure(s) comprise anti-phase driving comb structure(s).

7. The device of claim 1 wherein the peripheral movable structure(s) and the flexible tilting member(s) are configured to convert a pure tilting out-of-plane motion to a pure translational out-of-plane motion for the purpose of sensing an out-of-plane motion.

8. The device of claim 1 wherein the central movable structure(s) comprise at least one capacitor element.

9. The device of claim 1 wherein the peripheral movable structure(s) and the flexible tilting member(s) are configured to detect weak displacements due to a Coriolis force.

* * * * *